July 22, 1969     G. A. WESSELINK     3,457,523
EUROPIUM-TRI-DIBENZOYLMETHANE LASER
Original Filed Jan. 24, 1963
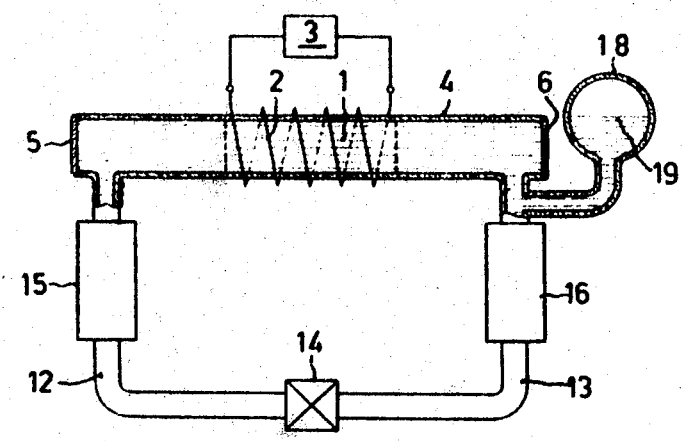
INVENTOR.
GUSTAAF ADOLF WESSELINK
BY
AGENT United States Patent Office 3,457,523
Patented July 22, 1969

3,457,523
EUROPIUM-TRI-DIBENZOYLMETHANE LASER
Gustaaf Adolf Wesselink, Emmasingel, Eindhoven, Netherlands, assignor, by mesne assignments, to U.S. Philips Corporation, New York, N.Y., a corporation of Delaware
Continuation of application Ser. No. 253,583, Jan. 24, 1963. This application Aug. 25, 1966, Ser. No. 575,193
Claims priority, application Netherlands, Jan. 25, 1962, 274,002
Int. Cl. H01s 3/00, 3/14; C07d 5/00
U.S. Cl. 331—94.5                     1 Claim

ABSTRACT OF THE DISCLOSURE

An optical maser employing a liquid medium consisting of a rare-earth metal chelate in a solvent.

---

The invention relates to an optical maser for amplifying or producing radiation, for example visible light and infrared radiation, by stimulated emission of radiation, which maser comprises a medium having a number of energy levels and contained at least partly in a space intended for the stimulated emission of radiation and auxiliary means for producing a state of negative temperature distribution of the population of at least two energy levels of the medium and auxiliary means for leading out the amplified or produced radiation from the space intended for the stimulated emission of radiation.

A state of negative temperature distribution of the population of two energy levels of the medium is to denote, as usual, a state in which the higher energy level of the said two levels has a greater population than the lower energy level. The energy levels may correspond to energy states of electrons in the medium, in which case the negative temperature distribution may be obtained by bringing electrons in a known physical manner by means of radiation to a higher state of energy. The expedients for producing the negative temperature distribution may in this case be formed by a radiation source, while the frequency of the emitted radiation corresponds to the energy required to bring an electron to a higher state of energy. In many cases a source of visible light may be employed. In the literature the production of a negative temperature distribution is often termed "pumping."

With an optical maser use is made of stimulated emission of radiation, which is to denote, as usual, a transition from a higher energy level to a lower energy level, while radiation is emitted under the action of stimulating radiation having a frequency corresponding to the energy difference between said levels. Contrary thereto, a spontaneous emission is such a transition while radiation is emitted and no stimulating radiation is available. The radiation obtained by stimulated emission (stimulated radiation) is in phase with and correlates to the stimulating radiation and amplifies the stimulating radiation so that a coherent radiation is obtained. By causing the stimulating radiation to cover a long path through the medium having the negative temperature distribution, for example, by arranging the medium between two parallel flat mirrors, so that the radiation in the medium reciprocates between the mirrors, while at least one of the mirrors is partly transparent and part of the radiation can emanate always through one of the mirrors, stimulated radiation is constantly added to the stimulating radiation so that a coherent radiation beam, for example a light beam, can be obtained, which has a high intensity and a narrow bandwidth. Such a maser is, consequently, a source of coherent radiation.

The auxiliary means for conducting away the amplified or produced radiation consists in this case of the partially transparent mirror.

The stimulating radiation may be fed to the medium from the outer side. In this case reference is made to intensification by stimulated emission. The stimulating radiation may, however, as an alternative, be supplied by the medium itself, for example by spontaneous emission. Spontaneous emission can initiate the stimulated emission, so that a coherent radiation may be obtained.

Optical masers are known in which the medium is formed by a gas. These gas masers can operate only on comparatively low powers, while because the gas must be at low pressure, the construction is complicated. Moreover, such masers can operate only in a restricted temperature range and their noise ratio is comparatively high.

It has been proposed to use liquid media, but no satisfactory liquid media have yet been mentioned.

Furthermore, optical masers are known in which the medium consists of a solid substance, for example a crystal. These masers can operate on much higher powers than the gas masers. Reference has been made to solid media consisting of a crystal with incorporated impurities in the form of a transition element, which has the levels suitable for stimulated emission. A frequently employed medium of said kind consists of a ruby. In this case the impurities are chromium atoms. An advantage of such media consists in that with the production of the negative temperature distribution in the medium by incident radiation (pumping radiation) the incident radiation is absorbed in a large range of wavelengths, so that the source of pumping radiation has to fulfill comparatively easy requirements.

However, there are few solid media of the kind described above, in which adequate stimulated emission can be obtained. The cause of this phenomenon may be due to the fact that the levels of the transition elements suitable for stimulated emission are readily disturbed to an extent such that stimulated emission is practically no longer possible, since these levels are associated with energy states of electrons occurring in a shell on the outer side of the atom. Owing to the very restricted choice of such media, they, in common, cover only a very restricted part of the visible spectrum and the directly adjacent ranges of wave-lengths with respect to the radiation to be obtained by stimulated emission.

By the use of rare earth metals as impurities in inorganic crystals the possibility of choosing the wavelength of the radiation to be obtained by stimulated emission has been greatly extended. The levels in these media suitable for stimulated emission are associated with energy states of electrons contained in an incompletely filled inner shell of the atoms of the group of the rare earth metals, so that these levels are disturbed with much greater difficulty only, for example by surrounding atoms and crystal fields than is the case with the transition elements.

An important disadvantage of these known media, the atoms of which belong to the group of the rare earth metals, is that in the operation of the optical maser only a very restricted range of wave-lengths of the pumping radiation is absorbed, so that the source of pumping radiation has to fulfill severe requirements, for example with respect to a high intensity in a small range of wavelengths.

The invention has for its object inter alia to provide a group of media for use in optical masers, in which the choice of the wave-length of the radiation to be obtained by stimulated emission is great and in which these media can absorb pumping radiation in a large range of wavelength when a negative temperature distribution is produced therein by incident pumping radiation, while these media are suitable for operating on comparatively high powers.

In accordance with the invention an optical maser of the kind set forth employs as a medium a solution of a fluorescent substance: This fluorescent substance consists of molecules having a fluorescent atom having an incompletely filled inner shell, surrounded by organic radicals. The organic radicals have a screening effect between the fluorescent atom and its surroundings, while the absorption of pumping radiation is possible in a broad range of wave-lengths.

It should be noted that an organic radical is to denote, as it is conventional in chemistry, an organic group of relatively bonded atoms, which group may be bonded as a whole to a further atom, in this case a fluorescent atom.

Disturbing effects of the surroundings on the levels suitable for stimulated emission are furthermore restricted by the fact that these levels relate to energy states of elecrons comprised in an incompletely filled inner shell of the fluorescent atoms, which shell is more or less screened by an outer shell of the atom from the surroundings. Therefore the fluorescent atom consists preferably of an element of the group of the rare earth metals, since these elements have a deep, incompletely filled inner shell. In particular europium is found to give satisfactory results. Terbium also yields good results.

Use is made in this case with great advantage of dissolved substances, the organic radicals of which extend over a distance between 3 to 1000 A. from the associated fluorescent atom. With smaller distances the screening effect is very small, whereas with larger distances the stray of radiation in the medium by the molecules themselves may become troublesome. It is efficient to use dissolved susbtances the organic radicals of which extend over a distance between 5 to 30 A. from the associated fluorescent atom.

The organic radicals, at least the atoms of such radicals directly bonded to the fluorescent atom preferably, surround the fluorescent atom substantailly uniformly. Thus the interaction between the fluorescent atom and the solvent is restricted as far as possible, while an effect, if any, on the levels of the flourescent atom by the organic radicals themselves is minimized also. Satisfactory results are obtained especially with a substanially surrounding of the fluorescent atom octahedrally with the atoms directly bonded to the fluorescent atom and associated with the organic radicals.

The favorable effect of such uniform surrounding may be enhanced by using molecules in which the atoms directly bonded to the fluorescent atom and belonging to the organic molecule radicals consist of the same element.

It is found to be particularly efficaceous to use dissolved substances, the organic radicals of which have conjugated bond systems, i.e. systems of conjugated double bonds. The favorable effect of such dissolved substances is based on the fact that the organic radicals having conjugated bond systems have a very wide absorption band and are thus capable of absorbing a great quantity of energy from the incident pumping radiations, while the absorbed energy is passed to the fluorescent atom.

The solvent must, of course, be transparent to the radiation to be obtained by stimulated emission and to the pumping radiation. Use is preferably made of an organic solvent, since it is found that such solvent can substantially not affect the levels of the fluorescent atom. These solvents have a small polar character, at any rate inferior to water.

In general, it is desirable for the medium to be cooled during operation of the optical maser, since in operation heat is developed, while in general, the operation of an optical maser according to the invention is improved by cooling the medium below room temperature. Cooling may be particularly simple by using a flowing medium, which will be explained more fully hereinafter. To this end solvents having a low freezing point are desired, preferably solvents consisting of a liquid mixture containing molecules of greatly different size and/or structure. Particularly suitable are solvents consisting at least partly of strongly asymmetrically built-up molecules.

The invention will be described more fully with reference to a few embodiments and to the drawing.

The figure shows diagrammatically in a cross-sectional view an example of the construction of an optical maser.

The maser shown in the figure comprises an elongated space 1, intended for the stimulated emission inside a tubular body 4 accommodating a medium in which a state of negative temperature distribution can be produced, for example by radiation with visible light. The auxiliary means for producing the negative temperature distribution may be formed by a discharge tube 2 wound helically around the tube 4. At least at the area of the discharge tube the tube 4 is transparent to light and is made, for example of glass. At the ends the tube 4 is closed by two mirrors (the mirror surface being at right angles to the plane of the drawing) 5 and 6, which are parallel to each other. The mirrors 5 and 6 may be formed by a glass plate coated with an aluminum layer. They may be secured to the ends of the tube 4 by cementing with a resin. The mirror 6 may be partially transparent and serves as an expedient for conducting away radiation from the space 1.

The maser operates as follows. By irradiating the medium in the space 1 with the aid of the discharge tube 2, which may be connected to a voltage source 3, a negative temperature distribution is produced in the medium inside the space 1. Thus spontaneous emission of radiation will occur in the medium. Part of this radiation will be reflected by the mirrors 5 and 6 and will reciprocate between the mirrors, and start the stimuated emission, so that radiation will constantly emanate from the partially transparent mirror. The produced, emanating radiation beam is a coherent beam. Consequently, the maser is a source of coherent radiation.

When a flowing, liquid medium is employed, the medium is particularly homogeneous, so that stray losses of radiation are at a minimum, while heat produced by emission in the medium itself and heat produced by the irradiation of the discharge tube 2 are conducted away. Thus, the maser is suitable for high power and continuous operation.

A liquid medium may be held simply in a cycle including the tubes 12 and 13 and the fluid pump 14. The cycle includes preferably an expansion space 18, in which an inert gas, for example nitrogen, is available above the fluid level 19. The fluid pump is preferably formed by a system shut off from the surroundings, so that no impurities can reach the fluid from the outside via the pump. In the tubes 12 and 13 the fluid may be in thermal contact with the ambient air, so that it is cooled. In order to raise the power of the maser, frequently a more intensive cooling is desirable, to which end a cooler 15 is included in the cycle. Then the fluid may be cooled by liquid air, which may be contained in a space arranged around the tube 12 and formed by the cooler 15.

Such an intensive cooling may give rise to crystallization nuclei in the fluid. In order to avoid continuation of the crystallization the fluid may be heated with the aid of a source 16, shortly after the fluid leaves the space 1 and before it is cooled by the cooler 15. Owing to this heating the crystallization nuclei disappear, so that the growth of the nuclei is strongly restricted. The source of heat 16 may be formed by an electrical heating wire wound around the tube 13, or it may be a heat exchanger.

Hereinafter some examples will be given of media suitable for use in an optical maser according to the invention, which maser may have a structure as described above. These examples relate to solutions of a fluorescent substance, which consists of molecules with a fluorescent atom having an incompletely filled inner shell, surrounded by organic radicals. The fluorescent atoms in this media consist of the elements europium or terbium which belong to the group of the rare erath metals. The atoms directly bonded to the fluorescent atom surround the fluorescent atom substantially uniformly, i.e. in practice in the form of an octahedron. All these surrounding atoms consist of the same element, i.e. oxygen. The molecules are associated with the group of the so-called chelates, in which an organic radical is bound by more than one of its atoms to the same metal atom. The following examples relate to neutral chelate molecules, in which three organic radicals are bound each with two oxygen atoms to one atom of the group of the rare earth metals. In principle they may be considered to be formed by the reaction of a trivalent positive ion of the group of rare earth metals with three organic chelate-producing molecules, which then give off each one proton.

There follow first a few examples of chelates which may be considered to be formed by the reaction of trivalent ions of rare earth metals with derivatives of propane-dione-1,3, in which the hydrogen atoms of the carbon atoms 1 and 3 are replaced by organic radical groups.

A first example of the last-mentioned chelate type may be terbium tri-acetylacetone $(CH_3COCHCOCH_3)_3Tb$.

A 1% solution of said complex in a suitable solvent, for example ethyl alcohol or pyridine, constitutes a medium for stimulated emission of green radiation.

The aforesaid terbium complex contains two methyl groups at the propane-dione-1,3-radical. One or more of these methyl groups may be considered to be replaced by organic groups having conjugated double bond systems, for example phenyl or naphthyl groups, especially the europium complexes of such chelates have been investigated. Solutions of the following europium complexes of this type constitute media for stimulated emission of red radiation:

europium-tri-dibenzoylmethane $$(C_6H_5COCHCOC_6H_5)_3Eu$$

europium-tri-benzoylacetone $(C_6H_5COCHCOCH_3)_3Eu$;
europium-tri-β-naphthoylacetone

europium-tri-α-naphthoylacetone

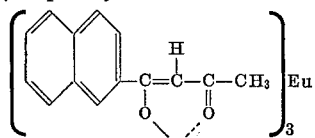

Europium-tri-dibenzoylmethane especially gives very good results.

The following examples of dissolved chelate complexes of europium contain organic radicals of salicylaldehyde itself, or of derivatives thereof, in which one or more hydrogen atoms bound to the benzene core are replaced by other groups. The radicals contain a benzene core which, as is known, comprises a conjugated double bond system. Solutions of the following europium complexes of the last-mentioned type permit obtaining stimulated emission of red radiation:

europium-tri-salicylaldehyde

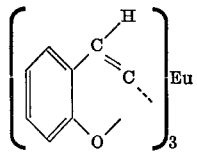

europium-tri-nitrosalicylaldehyde

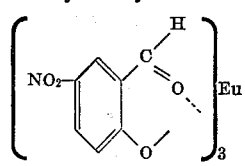

europium-tri-3,5-dinitrosalicylaldehyde

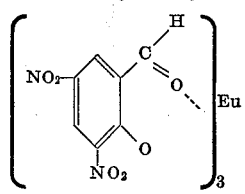

In the following table there are indicated data with respect to the wave-lengths of the emitted lines with the use of a few media according to the invention, described above by way of example. The media mentioned in the table are always approximately 1% solutions:

TABLE

| Dissolved substance | Solvent | The wave-lengths "A" associated with the emitted lines are appr. |
|---|---|---|
| Europium-tri-dibenzoylmethane. | Chloroform | 6,120 and 6,130. |
| Do | Tetrachloride | 6,130. |
| Do | Pyridine | 6,130 and 6,170. |
| Do | Mixture of isopentane and tetrahydrofurane 2:1 (p. by v.). | 6,130 and 6,170. |
| Europium-tri-benzoylacetone. | Pyridine | 6,120, 6,134 and 6,172. |
| Do | Carbon tetrachloride | 6,125 and 6,127. |
| Do | Chloroform | 6,118, 6,129 and 6,140. |
| Europium-tri-5-nitrosalicylaldehyde. | Mixture of tetrahydrofurane and pyridine 1:1 (p. by v.). | 6,135 and 6,175. |
| Do | Mixture of pyridine and isopropylbenzene 1:1 (p. by v.). | 6,134 and 6,175. |
| Europium-tri-3,5-dinitrosalicyl-aldehyde. | Tetrahydrofurane | 6,145. |
| Do | Pyridine | 6,145. |
| Do | Acetone | 6,145. |
| Do | Propanol 1 | 6,145. |

The Tb-acetylacetone complex provides an emitted line at approximately 5400 A.

It will be obvious that the invention is not restricted to the examples given above and that within the scope of the invention many variations are possible to those skilled in the art. For example, the optical maser described with reference to the figure may be modified in a simple manner so that in operation the medium flows between and parallel to the mirrors 5 and 6. Thus, the risk of turbulence in the medium between the mirrors is restricted. Moreover, complexes of other elements of the group of the rare earth metals than those mentioned above may be used, while there is a wide choice of organic radicals, since organic chemistry offers many possibilities.

What is claimed is:

1. An optical maser for stimulated emission of radiation comprising a housing adapted to contain a liquid and providing a resonant cavity for radiation emitted by the liquid, said liquid having a plurality of energy levels and which can be stimulated into emission of radiation, means to supply energy to said liquid for establishing a state of negative temperature distribution of the population of at least two energy levels of the liquid, and means for conducting away radiation emitted by said liquid from said housing, said liquid consisting of a solution of europium-tri-dibenzoylmethane in an organic solvent which substantially does not absorb the radiation emitted by said compound when stimulated by the establishment of a state of negative temperature distribution of the population of at least two energy levels thereof.

References Cited

UNITED STATES PATENTS

| | | | |
|---|---|---|---|
| 2,366,464 | 1/1945 | Wilson | 260—346.1 |
| 2,747,598 | 5/1956 | Wooldridge | 137—568 X |
| 2,837,516 | 6/1958 | Sarett et al. | 260—346.1 X |
| 2,896,862 | 7/1959 | Bede | 137—568 X |
| 3,131,721 | 5/1964 | Allen | 137—202 X |
| 3,146,796 | 9/1964 | Everett | 137—207 X |
| 3,349,339 | 10/1967 | Thorington | 331—94.5 |

OTHER REFERENCES

Weissman: "Intramolecular Energy Transfer," J. Chem. Phys., vol. 10, pp. 214–217, April 1942.

Maiman et al.: "Stimulated Optical Emission in Fluorescent Solids," Physical Review, vol. 123, No. 4, Aug. 15, 1961, pp. 1145–1157.

DONALD L. WIBERT, Primary Examiner

E. BAUER, Assistant Examiner

U.S. Cl. X.R.

137—207, 334, 568; 165—30, 108; 260—429.2, 346.1